Figures 1, 2:
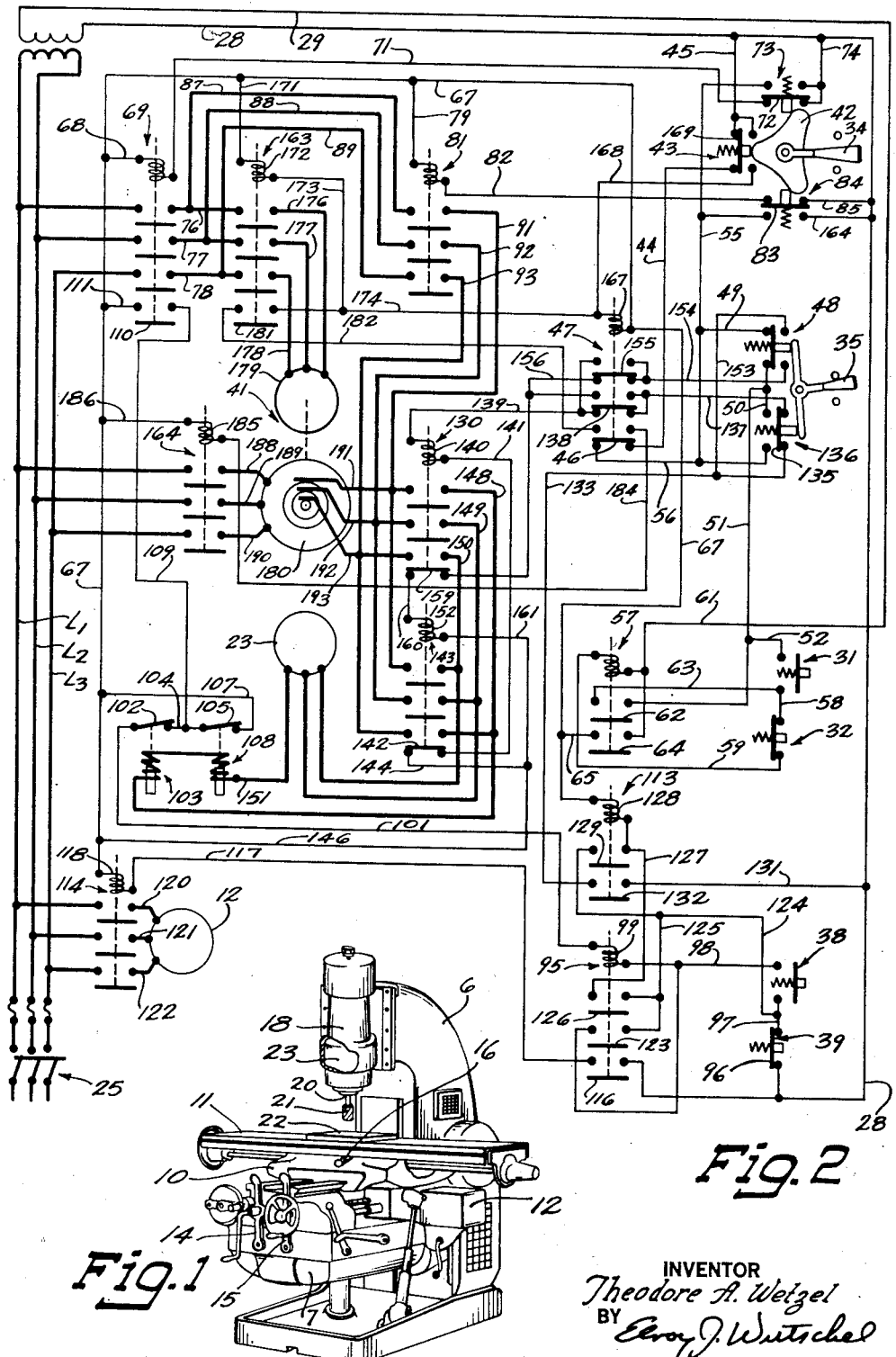

March 12, 1957     T. A. WETZEL     2,785,365
MOTOR SPEED CONTROL
Filed May 3, 1954

INVENTOR
Theodore A. Wetzel
BY
Elroy J. Wintschel
ATTORNEY

United States Patent Office 2,785,365
Patented Mar. 12, 1957

2,785,365

MOTOR SPEED CONTROL

Theodore A. Wetzel, Brookfield, Wis., assignor to Kearney & Trecker Corporation, West Allis, Wis., a corporation of Wisconsin Application May 3, 1954, Serial No. 427,173

10 Claims. (Cl. 318—231)

This invention relates, generally to improvements in speed control systems for motors, and more particularly, to an improved speed control system for the main driving spindle motor of a machine tool.

In certain prior types of machine tools, it has been necessary to provide a tool spindle capable of operation at extremely high rates of speed. Some machines, likewise, were provided with tool spindles that could be driven at two different stepped rates of high speed. Such high speeds normally were obtainable by connecting an electric motor directly to drive the tool spindle, without the usual gear changing transmission to obtain different rates of output speed. To effect this result in the case of a tool spindle operable at two different rates of speeds, for example, 3600 R. P. M. and 7200 R. P. M., it has been the usual practice to employ a high speed motor in combination with a frequency changer to energize the spindle motor for operation at the higher speed. The lower speed rate was then obtainable by energizing the spindle motor directly from the power source. While this system of speed control has been most satisfactory, it obviously limits the use of the machine to those classes of work requiring one or another of two extremely high rates of operating speed. This arrangement thus precluded use of the machine for any work requiring a speed less than the lowest obtainable and seriously restricted the use of the machine.

A principal object of the present invention is to provide an improved speed control system for an electric motor, such as the spindle driving motor of a machine tool.

Another object of the present invention is to provide an improved stepped, speed controlling system for an alternating current motor of the induction type.

Another object of the invention is to greatly improve the flexibility of the operation of a machine tool having a spindle primarily intended for operation at extremely high rates of speed.

Another object is to provide improved means for utilizing a frequency changer in regulating the speed of an alternating current motor.

Another object is to provide improved overload control means for the spindle motor of a machine tool.

A further object is to greatly improve the flexibility of use and efficiency of a high speed machine tool.

A further object is to provide an improved control system capable of supplying control current at a plurality of different frequencies for energizing a motor to operate at a corresponding number of different speed rates.

A further object is to provide an improved rotary transformer for energizing a high speed motor to rotate at a selected one of a plurality of different speed rates.

A still further object is to provide an improved control system for selectively controlling the energization of the cooperating spindle motor and feed motor of a machine tool.

According to this invention, there is provided an improved control system adapted to selectively energize a main driving motor to operate at one of a plurality of stepped speed rates. In a preferred embodiment, the control system is incorporated in a machine tool provided with a rotatable tool spindle and a cooperatively mounted movable work support. A main driving motor is directly connected to drive the tool spindle and a cooperatively energizable feed motor is connected to drive the work support for feeding movement relative to the rotating tool spindle. Power for energizing the main driving spindle motor and the feed motor is derived from a source of alternating current of substantially constant frequency, the line current being directly connectable to energize the main driving motor for rotation at an intermediate speed rate. For energizing the main driving motor to rotate at an extremely high speed, there is provided a frequency changer set that is selectively connectable to supply current of high frequency to energize the motor for high speed operation. The frequency changer set is likewise connectable to supply output current of relatively low frequency to energize the main driving motor for rotation at a slow rate of speed. In order to prevent damage to a cutter during a machining operation, an adjustable stepped overload control device is operatively connected to deenergize the feed motor in the event of an instantaneous overload on the main driving motor. The adjustable overload control is operative to deenergize the feeding motor in accordance with the power available from the main driving motor which varies in accordance with the selected operating speed. The entire control system is so interconnected as to facilitate energization of the main driving motor for rotation at a selected speed in either a clockwise or counterclockwise direction and with the adjustable overload control being automatically operative to prevent overloads on the main driving motor.

The particular control system shown by way of illustration in the drawings, is particularly adapted for embodiment in any of various machine tool structures, such as milling machines, lathes, boring bars, or other generally similar machines. It will be apparent, however, that the control system can be employed with equal facility and advantage for many other applications requiring the selective speed control of a main driving motor, irrespective of whether or not this motor is operated in conjunction with a cooperatively energizable motor such as the feed motor that may be used in machine tools.

The foregoing and other objects of this invention, which will become more fully apparent from the following detailed specification, may be achieved by the particular apparatus and control system constituting an exemplifying embodiment of the invention that is illustrated in and described in connection with the accompanying drawings, in which:

Figure 1 is a view in perspective of a machine tool provided with a main driving spindle motor and a coperatively energizable feed motor; and, Fig. 2 is a circuit diagram, including the necessary associated control elements, which illustrates the improved method of stepped speed regulation and overload control.

Referring more specifically to the drawings and particularly to Fig. 1 thereof, the machine tool in which the control system constituting the invention is here incorporated, may be a milling machine of the knee and column type, such as the machine described and shown in its entirety in Patent No. 2,497,842, filed January 22, 1944, and issued February 14, 1950. It is to be understood, however, that the control system may be incorporated with equal advantage in other generally similar machine tools. Likewise, the improved speed control system may be used in other types of machines or may be used simply as a motor control per se.

As shown in Fig. 1, the machine tool there illustrated is a milling machine of the knee and column type comprising essentially a vertically upstanding supporting column 6 formed integrally with a forwardly extending base and being adapted to support the usual slidably superimposed work supporting members. A knee 7 slidably mounted on the front face of the column 6 for vertical adjustment is adapted to support on its upper surface a saddle 10 for movement toward or away from the front face of the column. The saddle 10 in turn is disposed to slidably support for longitudinal movement a work supporting table 11.

Power for effecting selective feeding movement of the knee 7, the saddle 10 and the table 11 is derived from a feed motor 12 secured to the rightward side of the knee 7. The feed motor 12 is connected to drive a variable feed transmission (not shown) carried within the knee 7 and which is in turn selectively connectable to drive the knee, saddle, or work supporting table. Directional feed levers 14, 15 and 16 at the front of the machine are selectively engageable from a central neutral position to respectively actuate reversing directional clutches (not shown), the latter being operable to transmit driving power from the feed transmission within the knee to effect feeding movement of the knee 7, the saddle 10, and the work table 11.

At the upper front portion of the column, there is carried a vertical spindle head 18 in which is rotatably journalled a vertically depending tool spindle 20 adapted to removably carry a cutting tool, such as the cutter 21, in cooperative work engaging relationship with a workpiece, such as the workpiece 22 mounted on the movable work table 11. Power for driving the tool spindle 20 is derived from a main driving spindle motor 23 carried within the spindle head 18. The arrangement is such that the stator of the motor 23 is secured within the spindle head 18 and the rotor thereof is keyed directly to the upwardly extending end of the tool spindle 20.

The improved control system for energizing the main driving spindle motor 23 at a selected speed, as well as for energizing the feed motor 12, is schematically shown by the control circuit in Fig. 2. As there shown, electrical energy of substantially constant frequency for operating the spindle motor 23 and feed motor 12, as well as the various control relays, is derived from line conductors $L_1$, $L_2$ and $L_3$, the line conductors being connected to a source of power by means of a disconnecting switch 25. In order to operate the motors 23 and 12, it is first necessary to energize a control circuit represented by light lines in Fig. 2. Power for energizing the control circuit is supplied by a transformer having a primary winding connected directly to the supply conductors $L_1$ and $L_2$ of the power circuit and having a secondary winding connected to supply current of reduced voltage to conductors 28 and 29 which are connectable to energize the control circuit by depressing a master start button switch 31.

As a prerequisite to operating the machine, it is necessary to predeterminately position a spindle speed selecting lever 34 and a direction determining spindle reverse lever 35 in a selected operating position. After the levers 34 and 35 have been positioned to obtain a desired speed and direction of rotation of the main driving spindle driving motor 23, the master start button switch 31 is depressed to transmit control voltage current from the conductors 28 and 29 to energize various associated control elements and relays of the control circuit. With the control circuit energized through operation of the master switch 31, a spindle start button switch 38 is operable to effect energization of the main driving spindle motor 23 as well as the feed motor 12. A spindle stop switch 39 may then be depressed to deenergize the spindle driving motor 23 and the feed motor 12 without deenergizing the control circuit.

To avoid damaging the spindle motor 23 or a cutter carried by the spindle 20 after the motors have been energized to rotate, an electrical interlocking arrangement is provided to preclude changing the speed or direction of rotation of the spindle motor while it is rotating. To this end, accidental movement of the speed selective lever 34 or the spindle lever 35, while the motors are energized to rotate, operates to immediately deenergize the entire control circuit as well as the motors 23 and 12.

The spindle speed selected lever 34, the spindle reverse lever 35, the master control switches 31 and 32, as well as the spindle motor control switches 38 and 39, constitute the control elements for effecting selective operation of the spindle motor 23 and the feed motor 12. To facilitate the description, inasmuch as the speed control system is based upon the principal of changing the frequency of the supply current to the main driving motor 23, it will be assumed that the source of supply delivers three-phase, 60 cycle, 220 volt alternating current to the line conductors $L_1$, $L_2$ and $L_3$. The power supply circuit from the line conductors $L_1$, $L_2$ and $L_3$, represented by the heavier lines in the drawings, is therefore connectable to supply 220 volt alternating current of substantially constant 60 cycle frequency for energizing the feed motor 12, and, in one condition of operation, for energizing the main driving spindle motor 23 to rotate at intermediate speed. In two other conditions of operation, as will hereinafter be more fully explained, a rotary transformer or frequency changer set 41 is operatively interconnectable between the line conductors $L_1$, $L_2$ and $L_3$ and the main driving spindle motor 23 for selectively energizing the latter motor to operate at either a low or a high speed. The frequency changer or rotary transformer set 41 may be connected to supply either 30 cycle, 110 volt current for energizing the motor 23 to rotate at low speed, or, alternatively to supply 120 cycle, 440 volt current to energize the motor 23 for operation at an extremely high rate of speed.

It will be further assumed that the main driving motor is of the so called high speed squirrel cage, induction type, having two poles, and being adapted to normally rotate at 3600 R. P. M. when energized by a three-phase, 60 cycle, 220 volt alternating supply current. It will be readily apparent that the speed of the main driving motor 23 may be selectively changed by changing the frequency of the supply current. The feed motor 12 is of the standard squirrel cage, induction type, adapted to rotate at 1800 R. P. M. when energized by current from the line conductors $L_1$, $L_2$ and $L_3$. No provision is necessary for electrically changing the speed of the feed motor 12, since the feed motor is connected through the variable feed transmission contained within the knee 7, Fig. 1, to drive one or another of the work supporting members including the knee 7, the saddle 10, and the work table 11 at a selected feeding rate.

Although certain arbitrary values have been assigned to the supply conductors and the motors, it is to be understood that the invention is not to be restricted to a conrol system appropriate for operation with motors of the particular type described or with the particular supply circuit described. In other words, the values assigned to the supply circuit, and the characteristics attributed to the motors, are for illustrative purposes only, and to more clearly describe the operation of the control system.

To fully describe the operation of the control system, each of three different operating conditions will be described in detail. To further simplify the explanation, however, the sequence of the description includes: first, operation of the main drive spindle motor 23 at intermediate speed (approximately 3600 R. P. M.); second, operation of the motor 23 at high speed (7200 R. P. M.); and third, operation of the motor 23 at slow speed (1800 R. P. M.).

To operate the main driving spindle motor 23 at intermediate speed in a forward direction of rotation, the speed selecting lever 34 is positioned in its intermediate position and the spindle reverse lever 35 is moved to its upward position, as shown in Fig. 2. Positioning the lever 34 as shown in the drawings, causes a cam 42 secured to the inner end of the lever to move the resiliently returnable contact bar of intermediate speed switch 43 into a position bridging a pair of contacts respectively associated with a conductor 44 and a conductor 45, the latter conductor being connected at its opposite end to the supply conductor 28 for the control circuit. The opposite end of the conductor 44 leads to a terminal associated with the normally closed contact bar 46 of a reversing control relay 47.

With the direction determining reverse lever 35 in its upward position, the resiliently returnable contact bar of a forward switch 48 is moved inwardly to bridge a pair of contacts respectively associated with a conductor 49 and a conductor 50 connected to a conductor 51 which is, in turn, connected to a conductor 52 associated with one contact of the master start button switch 31. From the conductor 49, the circuit continues through a conductor 55 to another conductor 56, one end of which leads to a terminal associated with the normally closed contact bar 46 of the reversing control relay 47.

Thus, with the speed selecting lever 34 and reverse lever 35 positioned as shown, a control circuit is established from the supply conductor 28 to one terminal of the master start switch 31. This control circuit extends from the conductor 28, through the conductor 45, the contact bar of the start switch 43 to the conductor 44, and through the closed contact bar 46 of the relay 47 to the conductor 56. The circuit continues through the conductor 55 to the conductor 49, the contact bar of the forward switch 48 to the conductors 50 and 51 to the conductor 52 connected to one terminal of the master control switch 31.

Whenever the master start button switch 31 is momentarily depressed, the control circuit continues from the conductor 52, through the contact bar of the switch 31 to a conductor 58, and through the normally closed contact bar of the stop button switch 32 to a conductor 59 connected at its opposite end to one terminal of a solenoid coil associated with the master start relay 57. The circuit continues through the coil of the relay 57 to a conductor 61 connected directly to the energized return conductor 29 to complete a starting circuit for energizing the coil and effecting upward movement of the relay 57 to a closed position.

With the master relay 57 in closed position, a holding circuit is then established from the energized conductor 51 through a closed contact bar 62 of the relay to a conductor 63 connected to the conductor 58, and thence through the closed contact bar of the stop switch 32 to the conductor 59 connected to one terminal of the coil of the relay 57, the holding circuit continuing through the conductor 61 to the energized return conductor 29. With the master control relay 57 in closed position, a circuit is likewise completed from the energized conductor 29, to the conductor 61, through the closed contact bar 64, to a branch conductor 65 connected to a conductor 67.

From the energized conductor 67, a circuit is completed through a branch conductor 68 to a coil associated with a power supply relay 69, the opposite terminal of the coil being connected by a conductor 71, a normally closed contact bar 72 of a low speed switch 73 to a branch conductor 74 connected to the energized line 28. With the coil energized, the relay 69 is moved upwardly to closed position in a manner that the three upper contact bars thereof are moved into position bridging the contacts respectively associated therewith to transmit 60 cycle, 220 volt supply current from the line conductors $L_1$, $L_2$ and $L_3$ to three intermediate power supply conductors 76, 77 and 78 respectively.

At the same time, another circuit is established from the energized conductor 67 to a branch conductor 79 through the coil of another relay 81 to a conductor 82 that is in turn connected through a contact bar 83 of a high speed switch 84, associated with the speed selecting lever 34, to a branch conductor 85 connected to the energized conductor 28. The relay 81 is thus caused to be moved upward to closed position, in a manner that supply current is transmitted from the intermediate supply conductors 76, 77 and 78 through conductors 87, 88 and 89, through the closed contact bars of the relay 81 to supply conductors 91, 92 and 93 respectively. Energization of the master control relay 57 thus operates to effect energization of the relays 69 and 81 for the purpose of transmitting main supply current from the conductor $L_1$, $L_2$ and $L_3$ through the contact bars of the relays to the supply conductors 91, 92 and 93.

With the control circuit conditioned as described, the spindle start button switch 38 may be momentarily depressed to effect energization of the main driving spindle motor 23 at the selected intermediate speed. After a short interval, as soon as the spindle motor 23 has reached operating speed, the switch 38 may again be momentarily depressed to effect energization of the feed motor 12. Initial or first movement of the spindle start button switch 38 to closed position operates to energize a feed motor control relay 95 by completing a control circuit from the energized conductor 28 through the normally closed contact bar 96 of the spindle stop switch 39 to a branch conductor 97, and thence through the closed contact bar of the switch 38 to a conductor 98 connected to one terminal of a coil 99 associated with the feed motor relay 95. From the coil 99 the circuit continues through a conductor 101 through the closed contact bar 102 of a high speed overload control relay 103 having its coil operatively interconnected in the motor supply circuit to the main driving spindle motor 23. Normally this circuit would continue from the contact bar 102 through a conductor 104 to another contact bar 105 to a conductor 107 that is in turn operatively connected to the energized return conductor 67. The contact bar 105 is associated with a low speed overload control 108 that likewise has its coil operatively connected in the motor supply circuit to the main driving spindle motor 23. The arrangement is such that the low speed overload control relay 108 operates to deenergize the feed motor control relay 95 in the event of an overload on the spindle motor 23, when the latter is energized to rotate with reduced power at its lowest speed. The high speed overload control relay 103, on the other hand, is operative to deenergize the feed motor control relay 95 in the event of an overload on the spindle motor 23 when the motor is energized to rotate with full power at intermediate or high speed.

To this end, whenever the main supply relay 69 is in closed position, a shunt control circuit is established from the conductor 104, through a conductor 109 to a closed contact bar 110 of the relay 69 and thence through a conductor 111 connecting with the energized conductor 67. By means of this arrangement, movement of the contact bar 105 of the low speed overload relay 108 will not operate to deenergize the feed motor control relay 95 when the main drive motor is operative to rotate at the intermediate or high speeds. At intermediate or high speed rotation of the main drive motor 23, the feed motor control relay is deenergized only when the contact bar 102 of the high speed overload control relay 103 is moved to open position.

Movement of the feed motor control relay 95 to closed position is only momentary, due to the opening of the high speed overload control relay 103, in response to the initial or first movement of the start button switch 38 to momentary closed position for starting the main motor 23. Movement of the feed motor relay 95 to a momentary closed position, however, does operate to complete a circuit for energizing a spindle control relay 113 to a closed position and likewise to energize a feed motor starting relay 114 to closed position. Momentary energization of the feed motor starting relay 114 to a closed position is effected by completion of a circuit extending from the conductor 28 through a closed contact bar 116 of the feed motor control relay 95 to a conductor 117, connected to one terminal of a solenoid coil 118 for the relay 114, the opposite terminal of which is connected to the energized conductor 67. Energization of the coil 118 operates to effect upward movement of the relay 114 to closed position in a manner that the contact bars thereof are moved into position bridging associated pairs of contacts to transmit line current from the conductor L1, L2 and L3 to conductors 120, 121 and 122 connected to the feed motor 12.

At the same time, a circuit for energizing the spindle control relay 113 to closed position is completed from the conductor 28, through the closed contact bar 96 of the spindle stop button switch 39, to a conductor 124, a conductor 125, through the closed contact bar 126 of the relay 95, to a conductor 127. The conductor 127 is connected to one terminal of a solenoid coil 128 having its opposite terminal connected to the energized conductor 67. Energization of the coil 128 effects immediate movement of the spindle control relay 113 to a closed position, thus completing a holding circuit to retain the relay in closed position. The holding circuit for the relay 113 is completed from the coil 128, the conductor 127, the closed contact bar 129 to the conductor 124, and thence through the normally closed bar 96 of the stop button switch 39 to the energized conductor 28.

Movement of the spindle control relay 113 to a closed position in turn operates to complete a circuit for moving a forward spindle motor starting relay 130 to a closed position, thus effecting energization of the main driving motor 23 for rotation at the selected intermediate rate of speed. The control circuit for energizing the forward motor starting relay 130 is completed from the energized conductor 28, through a branch conductor 131, the closed contact bar 132 of the spindle motor control relay 113 to a conductor 133. From the conductor 133, the circuit continues through a normally closed contact bar 135 of a reverse switch 136 associated with the reversing lever 35 to a conductor 137. The conductor 137 is in turn connected through a normally closed contact bar 138 of the reversing control relay 47 to a conductor 139 connected to one terminal of a solenoid coil 140 for the forward motor starting relay 130. From the coil 140, the return circuit continues through a conductor 141, a normally closed contact bar 142 associated with a reverse motor start relay 143, and thence through a conductor 144 to a conductor 146 connected to the energized conductor 67. The normally closed contact bar 142 constitutes an interlock preventing energization of the forward motor control relay 130 whenever the reverse motor control relay 143 is in closed position.

With the forward motor control relay 130 energized to closed position, the three contact bars thereof transmit supply current from energized conductors 91, 92 and 93 to conductors 148, 149 and 150 for transmitting supply current to energize the main driving spindle motor 23. Conductors 149 and 150 are connected directly to terminals of the motor 23, while conductor 148 is interconnected through the coils of the high speed overload relay 103 and the low speed overload relay 108 to a conductor 151 that is in turn connected to supply current to the motor 23.

As heretofore mentioned, the feed motor control relay 95 is energized only momentarily upon movement of the start push button switch 38 to momentarily closed position for starting the main driving motor 23. This is due to the fact that the high starting current required by the main driving motor 23 operates in a manner similar to an overload and energizes the high speed overload control relay 103 to effect movement of the contact bar 102 to an open position. Consequently, the holding circuit from the contact bar 102 through the conductor 101 to the coil 99 of the feed motor control relay 95 is interrupted, permitting the relay 95 to drop to open position, and thus interrupting the holding circuit through the conductor 117 to the coil 118 of the feed motor starting relay 114 to deenergize the feed motor 12. The sequence of events following the first movement of the start button switch 38 to momentary closed position leads to an almost immediate deenergization of the feed motor control relay 95 as the main drive spindle motor is attaining its selected operating speed, in this case, the intermediate speed of 3600 R. P. M.

After the main drive motor 23 has reached operating speed, the feed motor 12 may be started by moving the start button switch 38 to momentary closed position a second time, thus effecting a re-energization of the coil 99 to cause upward movement of the feed motor control relay 95 to a closed position. A holding circuit for the feed motor control relay 95 is then re-established from the energized conductor 124, to conductor 125, through the contact bar 123 of the relay to a conductor connected to the conductor 98 and thence to the coil 99. Since the contact bar 102 associated with the high speed overload control relay 103 is now retained in closed position, except in the event of an overload on the motor 23, the relay 95 will be retained in closed position to re-establish the circuit from the conductor 28 through the contact bar 116 of the relay to the conductor 117. As a result the coil 118 will be re-energized to effect closure of the starting relay 114 to energize the feed motor 12 at its proper operating speed.

The arrangement for starting the main driving spindle motor 23 by depressing the start button switch 38 a first time and then starting the feed motor 12 after the motor 23 has reached operating speed by depressing the switch 38 a second time is especially advantageous in the event of an overload on the main driving motor 23. As heretofore explained, an instantaneous overload on the motor 23 operates to energize the coil of the high speed overload control relay 103 to effect upward movement of the contact bar 102 with a consequent deenergization of the feed motor 12. In the event such an overload conditions occurs during a machining operation, feeding movement of the work table 11 is immediately stopped to avoid damaging either a workpiece mounted on the table 11 or a cutter carried by a tool spindle 20. As soon as the cause for the overload condition has been corrected, the spindle start button switch 38 can be again momentarily depressed to effect re-energization of the feed motor 12 and continued feeding movement of the work table 11 to complete the machining operation.

It will be understood, however, that the machine can be started by simply holding the spindle start button switch in closed position, and until both the spindle motor 23 and feed motor 12 are energized to rotate.

With the feed motor 12 energized and the main drive motor 23 energized to rotate at intermediate speed in a forward direction, a momentary movement of the stop button switch 39 to open position operates to interrupt the holding circuit to the coil of the spindle motor control relay 113 and the feed motor control relay 95 to respectively deenergize the motor 23 and the motor 12. In such a case, the master control relay 57, as well as relays 69 and 81 will remain energized so that the motors 12 and 23 may be re-started by operating the spindle start button switch 38 as previously described. The control system is so interlocked, however, that the depressing the master stop button switch 32, while the motors 12 and 23 are rotating, interrupts the holding circuit to the master control relay 57 to deenergize the feed motor 12 and the main drive motor 23. Movement of the master controll relay to open circuit interrupting position will of course effect an immediate deenergization of the respective coils and effect movement of the relays 69, 81, 95 and 113 to an open position. In a similar manner, any movement of the reverse lever 35 to reverse direction of rotation of the main drive motor 23, while the latter is rotating, is adapted to interrupt the holding circuit to the master control relay 57 with a consequent deenergization of the control circuit as well as the feed motor 12 and the spindle motor 23. In like manner, any movement of the speed selector lever 34 to change the speed of rotation of the main drive motor 23 while the latter is rotated will also effect a deenergization of the control system, the feed motor 12, and main driving motor 23.

To operate the main drive motor 23 at an intermediate speed in a reversed direction of rotation, the speed selecting lever 34 is retained in its intermediate position as shown in Fig. 2, and the reverse lever 35 is moved downwardly to actuate the contact bar 135 of the reverse switch 136. Depressing the master start switch 31 momentarily effects energization of the master control relay 57 to a closed position, the holding circuit for the coil of the relay 57 now being completed through the closed contact bar 135 of the reverse switch 136. Movement of the master relay 57 to upward closed position operates to complete a circuit through the contact bar 64 thereof for effecting energization of the coils of the relays 69 and 81, movement of these relays to closed position operating to transmit main supply current for energizing the conductors 91, 92 and 93 as hereinbefore explained. Initial movement of the start button switch 38 to a momentary closed position operates to effect a momentary energization of the feed motor control relay 95 to closed position, thereby effecting energization of the spindle control relay 113 to closed position, the holding circuit for which is completed from the coil 128 through the contact bar 129 to the conductor 124. Closure of the spindle control relay 113 operates to energize a coil 152 to effect upward movement of the reverse motor starting relay 143 to closed position, the contact bars of which are then operable to supply current of reversed phase sequence from the conductors 91, 92 and 93 to the conductors 150, 149 and 148 respectively. Completion of the power supply circuit through the contact bars of the relay 143 operates to energize the main driving motor 23 for reverse rotation. Whenever the main driving motor 23 is energized to rotate, the feed motor control relay 95 drops to open position to deenergize the feed motor 12. After the motor 23 reaches operating speed, it is necessary to again momentarily depress the spindle start button switch 38 to energize the feed motor 12 as fully explained hereinbefore.

The holding circuit for retaining the reverse motor starting relay 143 in upward closed position is completed from the conductor 131, through the contact bar 132 of the spindle motor relay 113 to a conductor 133, and thence to a conductor 153, the closed contact bar of the forward switch 48, to a conductor 154. From the conductor 154, the circuit continues through the normally closed contact bar 155 of the reverse control relay 47 to a conductor 156, and thence through a normally closed contact bar 159 associated with the forward motor starting relay 130. From the contact bar 159, a circuit continues through a conductor 160, through the coil 152 to the conductor 161, connected through the conductor 146 to the energized conductor 67.

With the reverse starting relay 143 energized to closed position, the main power line supply current of reversed phase sequence is delivered to the conductors 150, 149 and 148 to effect reversed rotation of the main driving motor 23 at intermediate speed.

Assuming now that the main drive motor is to be operated at high speed, then the speed selecting lever 34 will be moved downwardly in a manner that the cam 42 attached thereto actuates the contact bar 83 of the high speed switch 84 to closed position and at the same time permits resilient return of the contact bar associated with the intermediate switch 43 to its normally biased position. Next, the direction determining reverse lever 35 is moved upwardly in a manner to actuate the forward switch 48 for conditioning the control circuit to effect forward rotation of the main drive motor 23. With the lever 34 in its downward or high speed position, and the reverse lever 35 in upper or forward position, momentarily depressing the master start button 31 operates to energize the master control relay 57 to an upwardly closed position. Movement of the master relay 57 to closed position conditions the control system by effecting energization to a closed position of the main supply relay 69, a frequency converter drive motor relay 163, a frequency power supply relay 164, and the auxiliary reverse relay 47.

The holding circuit for retaining the master control relay 57 in closed position is completed from the master stop button switch 32 through conductors 58 and 63, and the closed contact bar 62 leading to the conductor 51. The circuit continues through the conductor 50, the closed contact bar of the forward switch 48, to a conductor 49, and then continues through conductor 55, the closed contact bar 83 associated with the high speed switch 84 to a conductor 164 connected to the energized input conductor 28.

With the master control relay 57 in closed position, a holding circuit is then established from the conductor 29, the conductor 61, the contact bar 64 and conductor 65 to energize the conductor 67 in a manner to retain the various associated controlling relays in energized closed position. The auxiliary reverse relay 47 is energized to a closed position by completion of a circuit from the conductor 67 through the coil 167 to a conductor 168 connected through the closed contact bar of the intermediate switch 43 to a conductor 45 connected to the conductor 28. At the same time, the power supply relay 69 is energized to a closed position by completion of a holding circuit from the conductor 67, through the coil to a conductor 71 connected through the normally closed contact bar 72 of the low speed switch 73 via conductor 74 to the conductor 28. In a similar manner, the drive motor relay 163 is energized to closed position by a holding circuit from conductor 67 through a branch conductor 171, through a solenoid coil 172 to a conductor 173, and thence through a conductor 174 connected to the conductor 168, the closed contact bar 169 of the switch 43, and the branch conductor 45 to the energized conductor 28.

With the power supply relay 69 and the frequency changer drive motor relay 163 moved to upwardly closed position, a power supply circuit is completed from the line conductors L₁, L₂ and L₃ through the closed contact bars of the relay 69 to conductors 76, 77 and 78, which are in turn connected by the closed contact bars of the relay 163 to energize conductors 176, 177 and 178 respectively. The latter three conductors 176, 177 and 178 are directly connected to effect reversed rotation of a driving control motor 179 that is mechanically coupled to drive the rotor of a frequency changer 180 at a speed of approximately 1800 R. P. M. The control motor 179 and the frequency changer 180 mechanically coupled thereto, constitute the frequency changer set 41.

Movement of the frequency changer drive motor relay 163 to upwardly closed position operates to complete another control circuit for effecting energization of the frequency changer supply relay 164 to a closed position. This is accomplished by movement of a lower contact bar 181 of the relay 163 to a closed position in a manner to complete a circuit from the energized conductor 174, through the contact bar to a conductor 182 that is in turn connected through the closed contact bar 46 of the energized reverse relay 47 to a conductor 184. The conductor 184 is connected to one terminal of a coil 185, having its opposite terminal connected to a conductor 186 extending to the energized conductor 67 for energizing the frequency supply relay 164 to closed position. With this condition existing, a supply circuit is connected to transmit three phase, 220 volt, 60 cycle supply current from the line conductors L₁, L₂ and L₃ through the closed contact bars of the relay to conductors 188, 189 and 190 that are connected directly to the stator of the frequency changer 180. With the control motor 179 energized to drive the rotor of the frequency changer 180 at 1800 R. P. M. in reverse direction to its stator field rotation energized by line supply current, the rotor of the frequency changer 180 is connected to deliver 120 cycle, 440 volt output current to the conductors 191, 192 and 193.

For intermediate speed, as hereinbefore explained, the phase sequence of the 60 cycle, 220 volt main supply current transmitted from the line conductors $L_1$, $L_2$ and $L_3$ to the conductors 91, 92 and 93 is such that closure of the forward motor starting relay 130 operates to effect energization of the main driving motor 23 in a forward direction. Conversely, energization of the reverse motor starting relay 143 operates to effect reverse rotation of the main drive motor 23.

With the frequency changer set 41 operative to supply 120 cycle, 440 volt output current, on the other hand, the output supply conductors 191, 192 and 193 are so interconnected with the conductors 91, 92 and 93 as to supply 120 cycle, 440 volt current having a phase sequence opposite to the phase sequence of the 60 cycle, 220 volt supply current. Thus, with the conductors 91, 92 and 93 connected to receive 120 cycle, 440 volt current from the frequency changer 180, the forward motor start relay 130 is actuated to closed position for transmitting the high cycle current to the conductors 148, 149 and 150 for energization of the main driving motor 23 to operate in a reversed direction of rotation at the selected high rate of speed, 7200 R. P. M. Alternatively, the reverse motor start relay 143 is actuated to closed position for effecting energization of the main driving motor to rotate at high speed in a forward direction of rotation. Movement of the reverse relay 47 to a closed position is operative to effect this changed result in the operation of the relays 130 and 143.

Thus, with the speed lever 34 positioned for high speed operation and the reverse lever 35 moved upwardly to effect forward rotation of the motor 23, the control circuit is so conditioned that the reverse motor relay 143 is energized to effect forward rotation of the motor at the selected high rate of speed. In like manner, with the lever 35 positioned to effect reversed rotation, the control circuit is so conditioned that the forward relay 130 is energized to effect reversed rotation of the motor 23 at high speed.

Actuation of either the relay 130 or the relay 143, depending upon the selected position of the reversing lever 35, may be effected as hereinbefore explained by momentarily depressing the spindle start button switch 38. Initial movement of the start button switch 38 to a momentary closed position operates to energize the feed motor relay 95 momentarily as well as the spindle control relay 113 for effecting energization of the main driving motor 23 in a selected direction of rotation at the high rate of speed. After the main driving motor 23 has reached its high operating speed, the switch 38 is momentarily depressed a second time to effect energization of the feed motor 12. The high speed overload relay 103 operates to deenergize the feed motor 12 both when starting the main driving motor 23 and in the event of an overload on the main motor 23 after it has reached its high operating speed.

In order to operate the main driving motor 23 at low speed, 1800 R. P. M., in a forward direction of rotation, the speed selecting lever 34 is moved upwardly in a manner that the cam 42 secured thereto actuates the contact bar 72 of the low speed switch 73. The reverse lever 35 is moved upwardly to again actuate the forward switch 50 for obtaining forward rotation of the main drive motor 23. With the levers 34 and 35 positioned as described, the control circuit is so conditioned that momentary movement of the master start switch 31 to a closed position operates to actuate to a closed position the auxiliary reverse relay 47, the relay 81, the frequency changer drive motor control relay 163, and the frequency changer supply relay 164.

In response to movement of the master start button switch 31 to momentary closed position, the master control relay 57 is energized to an upwardly closed position with a holding circuit therefore being completed from the conductor 63, through the contact bar 62, the conductor 51 to the conductor 50. The control circuit continues through the closed contact bar of the forward start switch 48 to the conductor 49, the conductor 55, the closed contact bar 72 of the switch 73 to a branch conductor 79 connected to the energized line 28.

With the relay 57 in closed position, a circuit is completed through the contact bar 64 thereof and a conductor 65 to energize the conductor 67. From the conductor 67, the circuit is completed through the coil 167, causing movement of the reverse relay 47 to closed position. In a similar manner, a circuit is completed from conductor 67, the conductor 79 through the coil of the relay 81 to a conductor 82, the normally closed contact bar 83 of the high speed switch 84 to a conductor 85 connected to the energized line 28. The relay 81 is thus energized to upwardly closed position. At the same time, another holding circuit is established from the conductor 67, conductor 171 through the coil 172 to the conductor 173, and thence through the conductor 174 to the conductor 168 which is connected through the contact bar of the switch 43 to the energized line 28. Movement of the relay 163 to closed position upon energization of the coil 172 operates to complete another control circuit from the conductor 174 through the closed contact bar 181 to a conductor 182, connected by the closed contact bar 46, to the conductor 184 that is connected directly to one terminal of the coil 185 of the frequency changer supply relay 164. The flow of current continues through the coil 185, effecting movement of the relay 164 to closed position, to the conductor 186 connected to the energized conductor 67.

With the relay 164 in closed position, a power supply circuit is completed from the 60 cycle, 220 volt line conductors $L_1$, $L_2$ and $L_3$ through the closed contact bars of the relay to energize the stator of the frequency changer 180. With this condition existing, the frequency changer 180 operates in a manner of a wound rotor, induction motor with the rotor energized to rotate in a forward direction. Thus, the rotor of the frequency changer 180 rotates in a direction opposite to the direction in which it is connected to be driven by the drive motor 179, whenever the frequency changer set 41 is operated to supply 120 cycle, 440 volt output current through the conductors 191, 192 and 193 for energizing the main drive motor 23 to operate at high speed. As a consequence, with the frequency changer 180 energized to operate in a forward direction, the phase sequence of the output current through the conductors 191, 192 and 193 is opposite to the phase sequence of the main supply line conductors $L_1$, $L_2$ and $L_3$.

The current of reversed phase sequence is transmitted from the conductors 191, 192 and 193 through the conductors 91, 92 and 93 and thence through the closed contact bars of the closed relay 81 to conductors 87, 88 and 89. The drive motor power supply circuit continues to branch conductors 76, 77 and 78 through the closed contact bars of the frequency changer drive motor relay 163 and thence through the conductors 176, 177 and 178 to supply current of reversed phase sequence for energizing the control motor 179 to rotate in a direction corresponding to the forward direction of the frequency changer stator field rotation. The frequency changer set 41, comprising the frequency changer 180 and its coacting drive motor 179, is now adapted to be operated in the manner of a concatenated motor without mechanical load. With the drive motor 179 operatively interconnected in the rotor circuit of the frequency changer 180, the speed of the frequency changer set 41 is stabilized at approximately 900 R. P. M. in a forward direction. The reversed phase sequence current delivered from the frequency changer rotor to the conductors 91, 92 and 93 is therefore of greatly reduced frequency and voltage, approximately 30 cycle, 110 volt.

With the current delivered to the conductors 91, 92 and 93 being of opposite phase sequence to that of the line current, it will be apparent that movement of the forward relay 130 to closed position effects energization of the main driving motor 23 in a reverse direction of rotation. Energization of the reverse motor relay 143 to closed position will operate the main drive motor 23 in a forward direction of rotation.

With the frequency changer set 41 energized to produce 30 cycle, 110 volt output current of reversed phase sequence in response to closure of the master starting relay 57, movement of the spindle control start switch 38 to momentary closed position operates to energize the reverse motor relay 143 to closed position for effecting forward rotation of the main drive motor 23 at slow speed; the control circuit having been predeterminately conditioned by movement of the reverse lever 35 to its upper or forward position. Depressing the switch 38 momentarily operates, as hereinbefore explained, to effect sequential energization of the feed control relay 95 and the spindle control relay 113. A holding circuit for the spindle relay 113 is established through the closed contact bar 129 thereof while the feed control relay 95 is deenergized by operation of the low speed overload relay 108 in response to the high starting current required by the main drive motor 23.

The low speed overload relay 108 is responsive to any overload exceeding the reduced power of the motor 23, when operated at low speed, because of the fact that the main supply relay 69 is in open position during low speed operation. As a result the shunt circuit through the conductors 109, the contact bar 110 and the conductor 111 is interrupted to permit the holding circuit for the coil 99 of the relay 95 to extend through the conductor 101, the normally closed contact bars 102 and 105 to a conductor 107 connected to the energized conductor 67. With this condition existing, therefore, the low speed overload relay 108 is responsive to any overload on the motor 23 to interrupt the holding circuit to the relay 95, thereby effecting a deenergization of the feed motor 12.

Reversed rotation of the main motor 23 at slow speed is obtained by predeterminately positioning the lever 34 in downward or slow speed position and the lever 35 in downward or reverse position. Sequential actuation of the master start switch 31 and spindle start switch 38, in turn, respectively energizes the frequency changer set 41 for supplying 30 cycle, 110 volt current, and energizes the forward relay 130 to closed position for effecting slow speed rotation of the motor 23 in reversed direction. The holding circuits for the associated controlling relays are completed as hereinbefore explained.

From the foregoing description and explanation of the control system herein set forth as exemplifying the invention, it is apparent that there has been provided a greatly improved and simplified speed control system for selectively energizing the cooperatively operable spindle and feed driving motors of a machine tool. Improved integrated control means are provided for selectively energizing one of the motors to rotate at a selected one of a plurality of different speed rates, and for automatically protecting the motor against different degrees of overload exceeding the power available at a selected operating speed.

Although the illustrative embodiments of the invention have been described in considerable detail for the purpose of setting forth practical exemplifying apparatus, it is to be understood that the particular structures and control systems herein described are intended to be illustrative only and that the various inventive features may be incorporated in other structural forms without departing from the spirit and scope of the invention as defined in the subjoined claims.

The principles of the invention having now been fully explained in connection with the exemplifying apparatus herein set forth, I hereby claim as my invention:

1. In a control system, a source of alternating current power of substantially constant frequency, a main motor selectively connectable to be energized by said source of power for rotation at an intermediate speed, a frequency changer having its stator connectable to receive input energy from said source of power, means for driving said frequency changer in a direction opposite to its rotating stator fields including a drive motor connectable to be energized by said source of power, a circuit connected to transmit output current of high frequency from said frequency changer for energizing said main motor to rotate at high speed whenever said drive motor is energized by current from said source, circuit means connectable to transmit output current from the rotor of said frequency changer to energize said drive motor for rotation at reduced speed in a direction corresponding to the stator field rotation of said frequency changer when said drive motor is disconnected from said source of power, and circuit means connectable to transmit output current of reduced frequency from said frequency changer for energizing said main motor to rotate at a greatly reduced speed.

2. In a speed regulating system, a motor, a source of alternating current connectable to drive said motor at one speed, a frequency changer having its stator connectable to receive input current from said source, means for driving said frequency changer comprising a drive motor mechanically coupled thereto, circuit means connectable to transmit output current from the rotor of said frequency changer for energizing said drive motor to rotate in a direction corresponding to the rotating stator field of said frequency changer, said frequency changer being adapted to rotate at reduced speed to supply output current of lower frequency than the current from said source, and circuit means selectively connectable to transmit output current of low frequency from said frequency changer for energizing said motor to rotate at a slow speed.

3. In an electrical speed control system; a source of electrical power of substantially constant frequency, a main drive motor; a first control circuit connectable to transmit current directly from said source to energize said main drive motor for rotation at an intermediate speed; a second control circuit connectable to energize said main drive motor for rotation at a high speed, said second control circuit comprising a frequency changer having its stator connectable to receive electrical input energy from said source, an auxiliary drive motor mechanically coupled to drive said frequency changer and adapted to be energized by current from said source for rotation in a direction opposite to the stator field rotation of said frequency changer, and an output circuit from the rotor of said frequency changer connected to supply current of high frequency to energize said main motor for rotation at high speed; a third control circuit connectable to so modify the operation of said frequency changer as to energize said main motor for rotation at a slow speed, said third control circuit comprising switching means adapted to interrupt the transmission of current from said source of power to said auxiliary drive motor, a concatenated circuit connection connectable to transmit output current from the rotor of said frequency changer to energize said auxiliary drive motor for rotation in the same direction as the stator field rotation of said frequency changer whereby said frequency changer is operative to supply output current of relatively low frequency, and circuit means connectable to transmit current of low frequency from the rotor of said frequency changer to energize said main motor for slow speed rotation; and, integrated control means comprising selector switches and associated circuit means operatively interconnecting said control circuits and being operable to activate a selected one of said control circuits for energizing said motor to rotate at a selected rate of speed.

4. In an electrical speed control system adapted to be energized from a source of alternating current of substantially constant frequency, a principal driving motor, a control circuit including switching means actuatable to transmit driving current from said source for energizing said principal motor to rotate at one speed in a forward direction, a frequency changer having a stator and a rotor, one selectively actuatable switch including circuit means connectable to transmit current from said source for supplying input energy to the stator of said frequency changer, an auxiliary drive motor operatively connected to drive the rotor of said frequency changer, a circuit connection including a second selectively actuatable control switch arranged to transmit output current from the rotor of said frequency changer for energizing said auxiliary drive motor to rotate in a direction opposite to the stator field rotation of said frequency changer, said frequency changer being adapted to supply output current of lower frequency and opposite phase sequence to that of the current from said source, integrated control means connected to simultaneously actuate said switching means to open circuit interrupting position and to actuate said control switches to closed circuit completing position for energizing said frequency changer and said drive motor, and a switch including circuit means selectively connectable to transmit low frequency output current of opposite phase sequence from said frequency changer for energizing said principal motor to rotate at slow speed in a forward direction.

5. In a motor control system, a main motor, a source of alternating supply current selectively connectable to energize said main motor for rotation at an intermediate speed in a forward direction of rotation, a frequency changer having its output selectively connectable to energize said main motor for rotation at a high speed or at a low speed in a forward direction, circuit means connectable to transmit input current to the stator of said frequency changer from said source of supply, a drive motor mechanically coupled to drive said frequency changer, a circuit connectable to transmit current from said source of supply to energize said drive motor whenever said frequency changer is to energize said main motor for high speed operation in a forward direction of rotation, another circuit selectively connectable to transmit output current from said frequency changer to energize said drive motor whenever said main motor is to be energized for extremely slow speed operation, and switching means operatively actuatable to reverse the phase sequence of output current from said frequency changer for energizing said main motor to rotate in a forward direction at low speed or at high speed depending on whether said drive motor is energized by current from said frequency changer or by current from said source.

6. In a speed selecting system, a motor connectable to be energized for operation at a selected one of three different rates of speed; a source of alternating current power selectively connectable to energize said motor for rotation at an intermediate speed in a forward direction; a frequency changer having its rotor output connectable to energize said motor for rotation in a forward direction at high speed, a circuit selectively connectable to transmit current from said source of power for energizing the stator of said frequency changer, a drive motor mechanically coupled to drive said frequency changer and being selectively connectable to be energized by said source of alternating current power, said frequency changer being so driven that the rotor thereof is operative to produce current of high frequency; and, circuit control means connected to so modify the operation of said frequency changer as to energize said motor for operation in a forward direction at a slow rate of speed, said circuit control means comprising switching means selectively actuatable to connect the output supply circuit from said frequency changer to energize said drive motor independently of the direct connection to said source of power, said frequency changer and said drive motor being adapted when so connected to rotate at greatly reduced speed in an opposite direction in a manner that the output current from said frequency changer is of extremely low frequency, and circuit means connectable to transmit reduced frequency current for energizing said motor to rotate at slow speed in a forward direction.

7. In a speed selecting system for a main driving motor, a three speed regulator movable to a selected one of three different operating positions for energizing said main motor to rotate at a selected one of three different stepped rates of speed, a source of alternating current of substantially constant frequency, primary control means connected to be operated by movement of said regulator into one selected position for transmitting current from said source to energize said main motor for operating at one speed; secondary control means connected to be operated by movement of said regulator into another of its selected positions for energizing said main motor to operate at a second of its selected speeds, said secondary control means comprising a frequency changer having its stator input connectable to be energized by current from said source, means for driving said frequency changer in a direction opposite to the rotating stator field thereof comprising an auxiliary drive motor connected to be energized by alternating current from said source, a supply circuit connected to transmit output current of changed frequency from said frequency changer to energize said main motor for operation at the second one of its speed; and tertiary control means connected to be operated by movement of said regulator into its third position to energize said main motor for operating at a third one of the selected speeds, said tertiary control means being operable to modify the operation of said frequency changer and said drive motor and comprising switching means operative to interrupt the transmission of power from said source to said drive motor, circuit means connected to transmit output current from the rotor of said frequency changer for energizing said drive motor to rotate at reduced speed in a direction corresponding to the rotating stator field of said frequency changer, said frequency changer and said drive motor being adapted to rotate at greatly reduced speed with the rotor of said frequency changer being adapted to produce output current of changed frequency from the rotor output of said frequency changer to energize said main motor for rotation at the third one of its selected speeds.

8. In a speed control system, in combination with a source of alternating current and a main motor connectable to be energized by said source of current for rotation at one speed in a forward direction, a frequency changer connectable to supply output current of reversed phase sequence to energize said main motor for rotation at a selected one of two other speeds, circuit means connectable to transmit input supply current to said frequency changer from said source, a drive motor mechanically coupled to drive said frequency changer, said drive motor being connectable to be energized by current from said source whenever said main motor is energized by output current from said frequency changer for rotation at a high speed, auxiliary circuit means connectable to transmit output current from said frequency changer for energizing said drive motor to rotate in an opposite direction when said drive motor is not being energized by current from said source, and switching means selectively operative to reverse the phase sequence of output current from said frequency changer for energizing said main motor to rotate in a forward direction whenever said frequency changer is connected to energize said motor for rotation at a selected low or high rate of speed.

9. In a speed regulating system for a main motor, a source of power selectively connectable to energize said main motor, a frequency changer having a stator selectively connectable to be energized by said source of power, a drive motor mechanically coupled to drive said frequency changer, a control circuit extending from said source of power and including a disconnecting switch actuatable for supplying current from said source of supply for energizing said drive motor, a supply circuit energizeable by the rotor of said frequency changer to selectively energize said main motor for operation at a high rate of speed, and means for modifying the operation of said frequency changer for energizing said main motor to operate at a greatly reduced rate of speed including auxiliary circuit control means selectively operable to actuate said disconnecting switch to an open circuit interrupting position as well as to operatively transmit output current from the rotor of said frequency changer to energize said drive motor.

10. In a control system, a motor, a source of alternating supply current connectable to energize said motor to rotate at intermediate speed, a frequency changer connectable to energize said motor for rotation at a high speed or a low speed, a drive motor mechanically coupled to said frequency changer, circuit means connectable to transmit current from said source for simultaneously energizing said frequency changer and said drive motor whenever said motor is to be energized for high speed rotation, circuit interrupting means operable to interrupt the energization of said drive motor by current from said source, and a circuit connectable to transmit output current from said frequency changer for energizing said drive motor whenever said motor is to be energized for rotation at low speed.

References Cited in the file of this patent
UNITED STATES PATENTS

| | | |
|---|---|---|
| 895,823 | Woodbridge | Aug. 11, 1908 |
| 1,593,400 | Gilt | July 20, 1926 |
| 1,693,296 | Hull | Nov. 27, 1928 |
| 2,137,990 | Rossman | Nov. 22, 1938 |
| 2,287,603 | Clymer | June 23, 1942 |
| 2,653,519 | Armitage et al. | Sept. 29, 1953 |
| 2,660,932 | Kemper et al. | Dec. 1, 1953 |

FOREIGN PATENTS

| | | |
|---|---|---|
| 182,653 | Germany | Feb. 11, 1907 |